May 8, 1962  W. H. BATEMAN  3,032,933
MEANS FOR FORMING THE TEETH OF GEAR WHEELS AND THE LIKE
Filed Feb. 24, 1959  2 Sheets-Sheet 1

Inventor.
William Henry Bateman
By Stanley Lightfoot
Attorney

United States Patent Office 3,032,933
Patented May 8, 1962

3,032,933
MEANS FOR FORMING THE TEETH OF GEAR WHEELS AND THE LIKE
William Henry Bateman, Overstream Cottage, Overstream, Loudwater, Rickmansworth, Hertfordshire, England
Filed Feb. 24, 1959, Ser. No. 794,906
Claims priority, application Great Britain Mar. 5, 1958
4 Claims. (Cl. 51—95)

This invention relates to the shaping of the teeth of gear wheels, (other than worm gear wheels) shaft splines or like parts of analogous workpieces of the kind in which the teeth or the like lie in the direction of their length parallel with the axis of rotation of the workpiece or inclined thereto, for example spur gears and helical gears, the forming of the teeth or the like being effected by a means of the kind in which a tool consisting of a rotary grinding wheel, or a cutting hob having a helically shaped periphery is employed and in which the workpiece is rotated during the forming operation at a rate such as would result by meshing the workpiece with a worm of the same pitch as the helix of the tool.

The object of the present invention is to provide a simple means for effecting relative rotations of a helically formed tool and a workpiece axially oriented and moved in a manner resulting in distribution of wear along the axial width of the tool.

A further object is to provide a machine of simple construction specially suitable for producing large numbers of identical gears or other workpieces of a given kind.

A still further object is to provide in a gear grinding machine, means for effecting truing of the helix of the grinding wheel.

In one aspect the invention consists of a machine of the aforesaid kind, comprising a workpiece and a toothed pinion of shape similar to that to be formed on the workpiece mounted upon parallel shafts geared together for rotationally engaging a helically formed rotary tool and a rotary control worm respectively, with the axes of the shafts being inclined to the axes of the tool and worm at an angle at which the helices of the tool and worm are substantially in alignment with the tooth flanks of the workpiece and the pinion and means for simultaneously moving the workpiece and the pinion at least in a direction at a right angle to the tool and worm axes.

Figure 1:
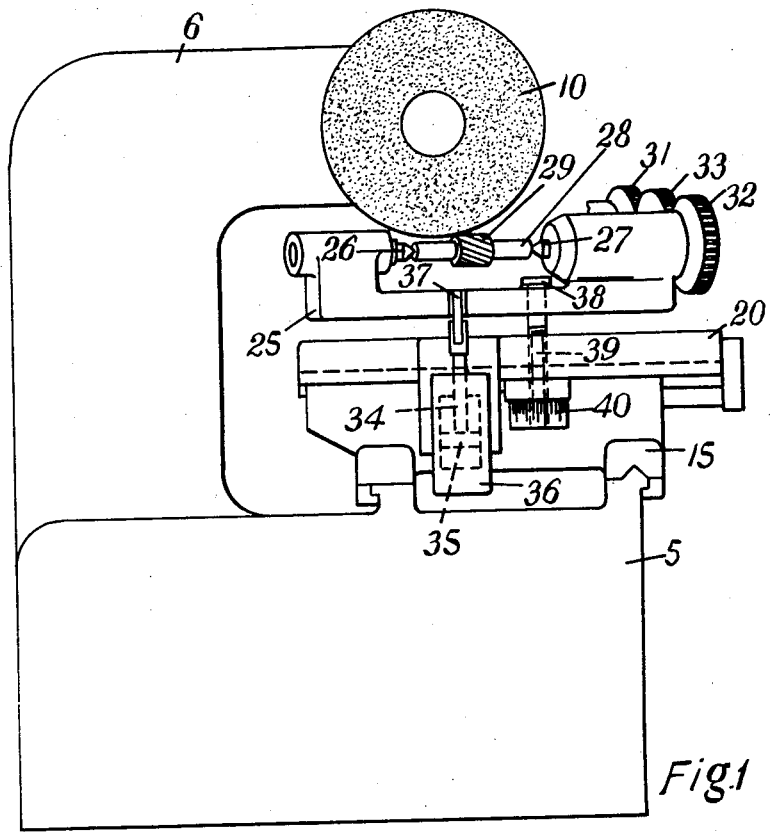
Figure 3:
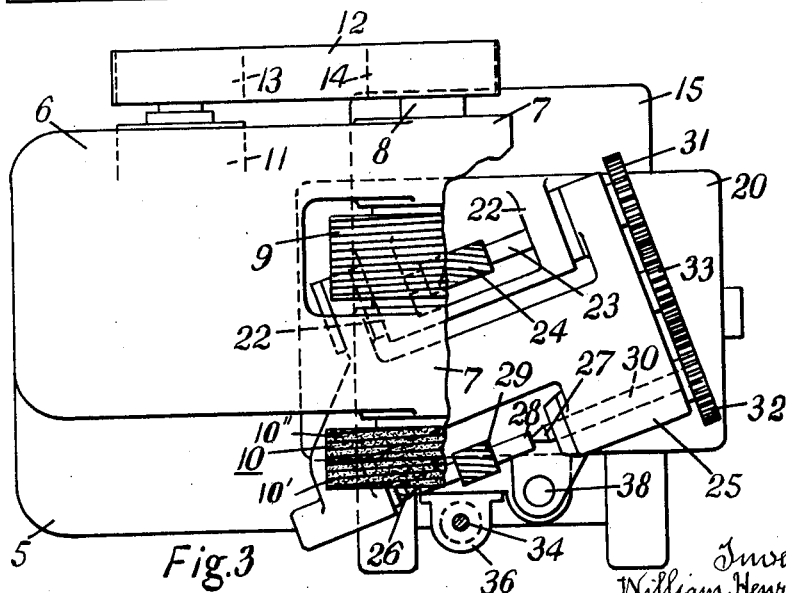
Figure 2:
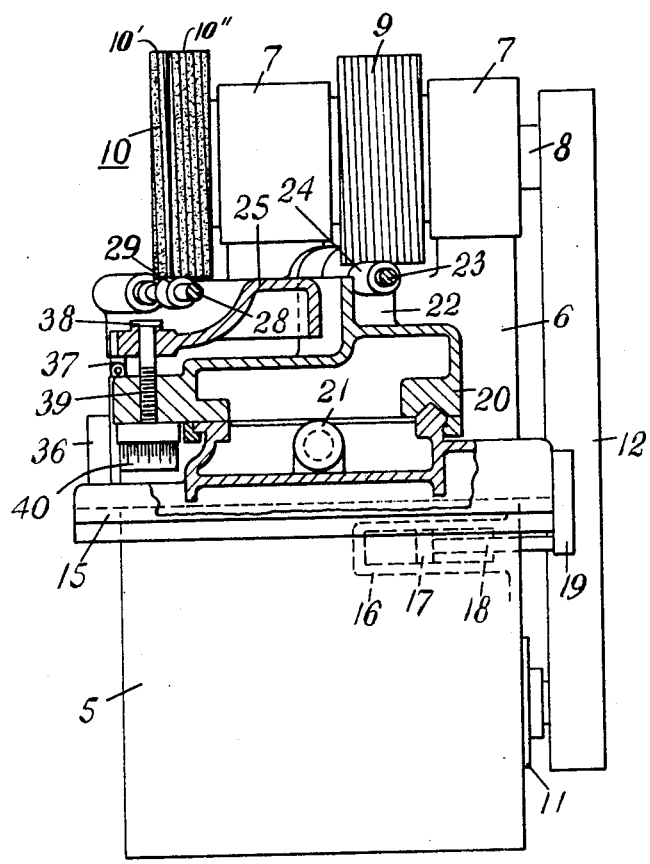

In the accompanying drawings:
FIGURE 1 is a side elevation, FIGURE 2 a fragmentary side elevation looking from right to left at FIG. 1, with portions removed and shown in section; and FIGURE 3 a plan (with a portion of the control worm and grinding wheel removed) illustrating a typical machine embodying the present invention.

Referring to the drawings, the machine comprises a bed 5 on which is formed or secured an upwardly extending pillar 6 provided with bearings 7 for a horizontal shaft 8. On this shaft are secured the control worm 9 and the tool, the latter consisting of a helically grooved grinding wheel 10, the helix of which being of the same pitch as that of the worm.

The shaft 8 is driven by an electric motor 11 (contained in the bed of the machine) through a belt 12 and pulleys 13, 14 on the motor shaft and the shaft 8 respectively.

On the bed of the machine is mounted a slide 15 which is movable horizontally in a direction parallel with the shaft 8, and is actuated by hydraulic means comprising a cylinder 16 contained on the bed of the machine and a piston 17 connected by a rod 18 to an attachment 19 secured to one end of the slide.

On the slide 15 is mounted a second slide 20 which is movable horizontally in a direction at right angles to the slide 15. The second slide is actuated by hydraulic means similar to that employed for actuating the slide 15 and consisting in part of a cylinder 21 carried by the slide 15.

On the second slide are formed bearings 22 for a shaft 23 which carries a pinion 24 for engagement with the control worm 9, and on the shaft 23 is carried one end of an angularly movable bracket 25 which is provided at its opposite end with a pair of co-axial centres 26, 27 for supporting a shaft 28 carrying the pinion 29 to be treated by the grinding wheel 10. The centre 27 is formed on or secured to a shaft 30 and any convenient means (not shown) are provided for securing the shaft 28 to the shaft 30. The shafts 23 and 30 are interconnected by pinions 31, 32 and an intermediate idle pinion 33.

Angular movement of the bracket 25 for moving the pinion 29 (hereinafter referred to as the workpiece) into and out of engagement with the grinding wheel 10, is effected by a hydraulically actuated piston rod 34 extending from a piston 35 in a cylinder 36 carried by the slide 20, the piston rod being connected to the bracket 25 by a link 37. The extent to which the workpiece can be moved into engagement with the grinding wheel is determined by an adjustable stop 38 on the upper end of a rotatable stem 39 in screw-thread connection with the slide 20, the lower end of the stem having secured to it an indexed dial 40 which is operable by the user.

The two shafts carrying the pinion 24 and workpiece 29 are arranged parallel with each other, and their axes are so inclined to the direction of movement of the slide 20 that the teeth of the pinion 24 and workpiece 29 are in substantial alignment with the helices of the control worm 9 and the grinding wheel 10.

The arrangement is such that when the machine is in action the pinion 24 is rotated by the worm 9 and a corresponding rotation is imparted to the workpiece by the wheels 31, 32 and 33.

The axis of shaft 8 and the direction of movement of slide 20 correspond to two sides of a right angle triangle of which either the shaft 23 or 30 forms the hypotenuse, and during movements of slide 20 both worm 24 and workpiece 29 receive a component of movement parallel with the axis of shaft 8 proportional to the tangent of the angle between the direction of movement of slide 20 and the axis of shaft 23 or shaft 30. Thus movement of slide 20 causes the whole axial length of the workpiece to be acted on by the grinding wheel. Simultaneous movement of slide 15 causes the workpiece to traverse the whole of the axial width of the grinding wheel thereby distributing wear along the whole of its width.

While the grinding wheel may be made wholly as a single piece from any desired quality of abrasive material, it may be constructed from two or more discs of material 10' and 10" of different abrasive qualities. The first of these parts which initiates the grinding action on the workpiece may be made from a grade of material suitable for removal of metal from a workpiece of plain cylindrical form, so as roughly to form gear teeth thereon, the other part 10" or parts of the grinding wheel being made of such quality as will impart the desired accuracy and surface finish to the teeth of the workpiece. The workpiece by movements of slides 15 and 20 is caused to be acted upon successively by discs of different abrasive quality.

Periodic trimming of the grinding wheel to restore its form after wear may be effected by mounting on the spindle 28 a shaping tool presenting finished teeth of the same configuration as that of a finished workpiece, as shown in the drawings, for example By reciprocation of the slide 15 during movement of slide 20 towards the grinding wheel and rotation of the grinding wheel and tool, the grinding wheel periphery is restored to its desired form.

The control worm 9 and grinding wheel 10 may be made of the same diameter, or alternatively they may be made of different diameters. In the example illustrated by the drawings the grinding wheel is made of slightly larger diameter than the control worm, but of the same pitch. The pinion 24 meshing with the control worm 9 may have the same diameter and number of teeth as that of the workpiece 29 and in this case the gears 31 and 32 have equal diameters.

Alternatively, the pinion 24 may have a diameter and number of teeth differing from that of the workpiece if the ratio of gears 31 and 32 is modified to effect proper rotation of the workpiece relative to the grinding wheel. Thus, if the pinion 24 has a diameter and number of teeth three times that of the workpiece, gear 31 has three times the diameter and number of teeth of that of gear 32.

As already stated the machine is intended for use only in shaping the teeth of a workpiece of a given kind, as regards size and disposition of the teeth relatively to the axis of the wheel. When it is required to treat a workpiece of a different kind, the upper slide and bracket are replaced by a similar slide and bracket having the shafts 23 and 30 disposed at an angle to the line of motion of the slide appropriate to the disposition of the teeth on the workpiece.

Further when it is required to treat the workpieces by a cutting action, the grinding wheel 10 is substituted by an equivalent hob.

The invention is also applicable in essentially the same manner to that above described for shaping splined shafts or analogous workpieces having a toothed or like form.

Having thus described my invention what I claim as new and desire to secure by Letters Patent is:

1. A machine for grinding gear wheels, splines and the like, other than worm wheels comprising a helical tool and a control worm of the same helical pitch mounted upon a first rotary shaft, a toothed pinion of shape similar to that to be formed upon a workpiece mounted upon a second rotary shaft and in meshing engagement with said worm, a third shaft parallel with said second shaft adapted to hold and rotate a workpiece and to be rotated by a gearing connection between said second shaft and said third shaft, means for adjusting said third shaft in an arc about the axis of said second shaft, a slide for moving said second and third shafts in directions at right angles to said first shaft, and means supporting said shafts for mutual operation.

2. A machine as claimed in claim 1, which includes also a slide for moving the second and third shafts in a direction parallel with the first shaft.

3. A machine for grinding gear wheels, splines and the like, other than worm wheels comprising the combination of a bed, a support on the bed carrying a first rotary shaft on which are secured a control worm and helical tool, a first slide mounted on the bed and movable parallel with the said shaft, a second slide mounted on the first slide and movable at right angles thereto, a second shaft mounted on the second slide carrying a pinion meshing with the control worm and inclined at an angle relatively to the first shaft to support the pinion with its teeth in substantial alignment with the helix of the control worm, a bracket attached to and angularly movable about the second shaft, a third shaft carried by the bracket parallel with the second shaft and adapted for attachment of a workpiece thereto, gear wheels interconnecting the second and third shafts, an adjustable stop for determining the extent of movement of the bracket towards the tool, and means for actuating the slides and bracket.

4. A machine for shaping the teeth of gear wheels, splined shafts or the like, other than worm wheels, including a helically formed rotary tool, a similarly formed rotary control gear, means supporting said control gear and said tool in coaxial relation, a work spindle, a gear train driving said work spindle, a pinion driving said gear train from said control gear, means for driving said tool and control gear, a slide for supporting the pinion, gear train and work spindle for movement bodily relative to said tool and control gear, and means for moving said slide, characterised in that the pinion and work spindle axes are mutually parallel and inclined to the tool and control gear axis at an angle at which the helices of the gear and pinion are substantially in alignment and that the slide is movable at right angles to the latter axis.

References Cited in the file of this patent

UNITED STATES PATENTS

| | | |
|---|---|---|
| 219,892 | Albro | Sept. 23, 1879 |
| 1,343,982 | Parnall | June 22, 1920 |
| 1,708,570 | Hanson | Apr. 9, 1929 |
| 2,198,377 | Dunbar et al. | Apr. 23, 1940 |